A. B. PICKETT.
FERTILIZER MIXER.
APPLICATION FILED MAR. 26, 1910.

1,036,327.

Patented Aug. 20, 1912.
2 SHEETS—SHEET 1.

A. B. PICKETT.
FERTILIZER MIXER.
APPLICATION FILED MAR. 26, 1910.

1,036,327.

Patented Aug. 20, 1912.
2 SHEETS—SHEET 2.

UNITED STATES PATENT OFFICE.

ARTHUR B. PICKETT, OF UNION CITY, OHIO, ASSIGNOR, BY DIRECT AND MESNE ASSIGN-
MENTS, TO THE PLANT AND LAND FOOD COMPANY, OF BALTIMORE, MARYLAND, A
CORPORATION OF MARYLAND.

FERTILIZER-MIXER.

1,036,327.  Specification of Letters Patent.  Patented Aug. 20, 1912.

Application filed March 26, 1910. Serial No. 551,647.

*To all whom it may concern:*

Be it known that I, ARTHUR B. PICKETT, a citizen of the United States, and a resident of Union City, in the county of Darke and State of Ohio, have invented certain new and useful Improvements in Fertilizer-Mixers, of which the following is a specification.

My invention consists in a new machine for preparing compost or fertilizer.

Among the principal objects of the invention are the provision of an apparatus which will mix fertilizing materials in such a way that practically all the valuable ingredients of manure, which is used as the active base of the compost, are preserved and utilized.

Broadly described, my machine is constructed to carry out a process which consists in utilizing the active base and mixing the compost in such a manner that the active fertilizing agents of the manure are enabled to develop their greatest value with the addition of a minimum quantity of other fertilizing agents.

In order to enable others to carry out the invention I will now describe the construction of an exemplifying form of the machine.

Figure 1:
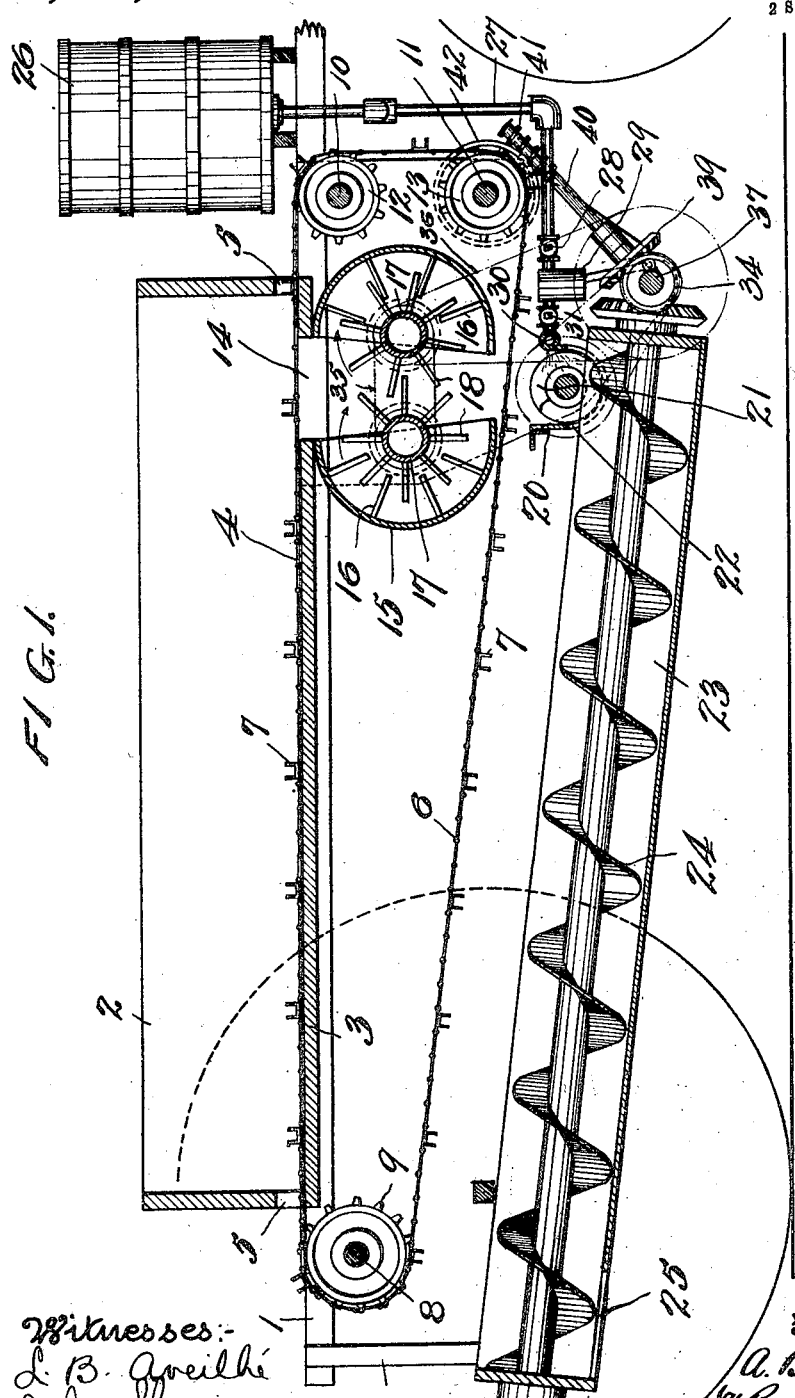
Figure 2:
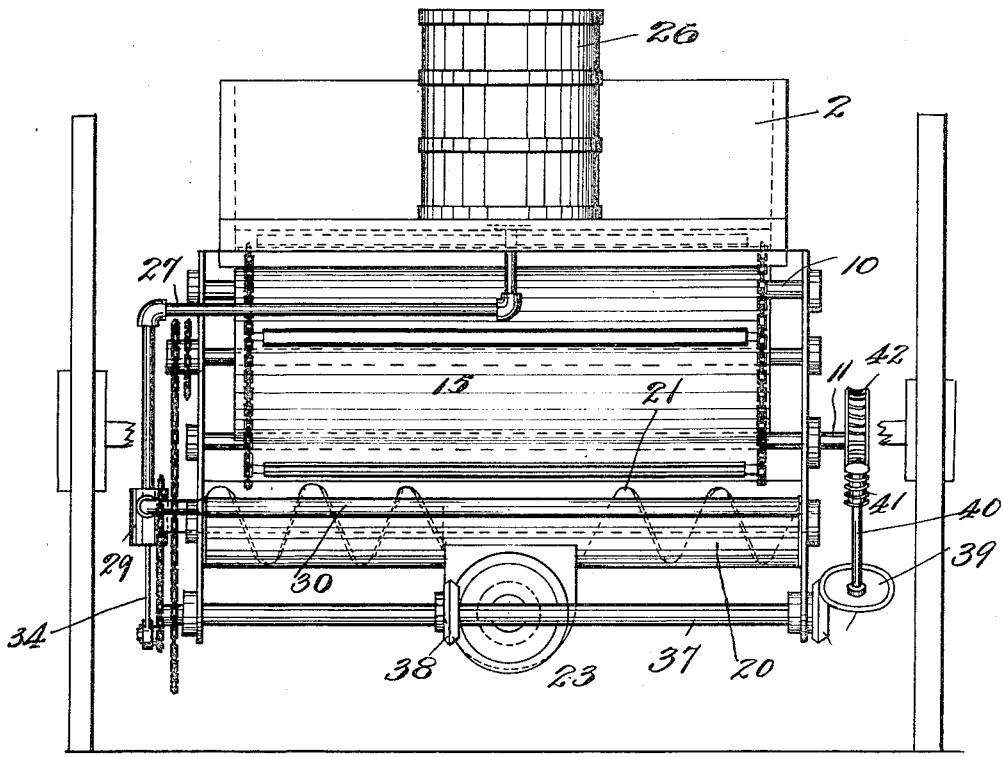

In the drawing, Figure 1 is a longitudinal diagrammatic section of one form of the machine and Fig. 2 is a front elevation.

The machine may be mounted on any suitable wheels and running gear.

Reference character 1 designates in general any suitable framework on which is carried the box 2 having a bed 3. The feed belt 4 runs along the bottom of the body and passes through openings 5 at the front and rear of the box. The belt consists of side chains 6 and cross bars 7. Shaft 8 at the rear of the machine carries sprockets 9 to support the rear end of the belt and shafts 10 and 11 carry respectively sprockets 12 and 13 to support and drive the forward end of the belt. Near the front end of the box there is a discharge opening 14 through the bed. Below the bed, adjacent to the discharge opening, are semi-cylindrical shields or hoppers 15 provided with blades or spikes 16 projecting inwardly, and within each of the hoppers is a rotary mixing shaft 17. Shafts 17 are provided with rotary spikes or blades 18 to coöperate with the blades 16 in the hoppers. Below the opening provided between the hoppers at the bottom is transversely arranged a trough 20 in which is a revolving conveyer 21, the helical blade of which is right handed on one side of the center and left handed on the other side so that material falling into the trough will be moved toward the center by the conveyer. The trough is provided with a central discharge opening 22 and beneath this opening is arranged the forward end of longitudinal trough 23 in which is the helical screw conveyer 24. The rear end of trough 23 is provided with a discharge opening 25.

On the forward end of the frame at a suitable elevation is mounted a tank 26, from which a pipe 27 leads past a valve 28 to pump 29 and then to a transverse spraying pipe 30 located in one edge of trough 20 and provided with spray openings directed into the trough. A second valve 31, if desired, may be placed between the pump and the spray pipe.

A drive pulley (not shown) may be placed on either of the rotary mixer shafts 17 as may be convenient, and connected to any suitable source of power. The shafts 17 are connected to revolve together by chain or belt 35. A chain or belt 36 connects the forward shaft 17 to a transverse shaft 37 and a crank and pitman 34 on said shaft operate the pump 29. The shaft 37 also drives the shaft of conveyer 24 through bevel gears 38 and said shaft 37 also drives, through a bevel gear 39, a worm shaft 40 carrying worm 41 engaging a worm gear 42 on the lower forward sprocket shaft 11 and by this means the belt 4 is impelled at a slow rate of speed.

The apparatus above described operates as follows: A suitable quantity of barnyard manure is thrown into the box from the rear end up to the opening 14 and then a suitable quantity of marl, soil or sod is thrown on top of the manure. On top of this a proper proportion of any suitable phosphate such as phosphoric rock or lime in pulverized form is placed. The machine being started, the belt 4 is impelled slowly toward the discharge opening 14 and the material in the box falls between the rapidly revolving blades 18 and is thoroughly cut up, broken and mixed by these blades coöperating with the stationary blades 16 in the hoppers 15. The thoroughly pulverized and mixed material then falls into trough 20 where it is further mixed and moved toward the central discharge opening by the conveyer 21. Tank 26 is filled with any suitable nitrate in solution and pump 29 or valve 28 is adjusted so that the pump will deliver the desired amount of the nitrate solution to the compost while it is in trough 20. The solution is thus thoroughly mixed and incorporated with the solid portions of the compost and the whole mass is discharged from trough 20 into trough 23 and is further mixed and moved toward the rear end of the last named trough and discharged at opening 25 and the material is then stacked up until wanted for use. After the machine has once been started the operation may be made continuous by continuing to fill the box as space is afforded at the rear end with the solid ingredients in suitable proportions.

The process, as will be understood from the previous description of the operation of the machine, consists in combining fresh manure and marl, soil or sod, and suitable phosphates in pulverized form and thoroughly and intimately mixing these materials and during the mixing process adding to the mass a suitable quantity of nitrate, potash compound, or other soluble fertilizing agent in solution.

My machine and process make it possible to form a compost of barnyard manure which will preserve and make available in the most advantageous way the active fertilizing values of the manure. By utilizing the fresh material and mixing it thoroughly with marl, soil or similar material, the free ammonia which would otherwise be leached out or dissipated in the atmosphere is absorbed and preserved. The bacteria present in the manure act upon the inert materials in the marl, etc., and the chemical actions set up in the compost, when properly mixed according to my method, convert the original phosphates and nitrates of the marl, etc., and of the solid and liquid agents added in the process, into active fertilizing elements which are available as plant food. The compost contains a large amount of humus which has great value in renewing spent soil. In the process of mixing, the nitrate solution added to the solid ingredients solidifies in minute crystals upon the fibers of the solid base and in this form the nitrates are so intimately combined with the mass that they are not leached or washed away even though the compost is left exposed to air and rain for a long time.

It has been found by experiment that compost made according to my process has a greater fertilizing value than a much greater bulk or weight of manure alone and this result is attained at smaller expense, comparing actual money values, than would be required to provide the same fertilizing value in pure manure. In addition the fertilizer is made more readily available for use and in general produces better results than manure alone.

I claim:

1. A compost mixer comprising a box bed, a feed belt moving through the box for forwarding solid material disposed in the box, a rotary bladed beater disposed adjacent to the discharge point of said belt for thoroughly fining and mixing material delivered from the belt, a receptacle for fertilizer solution, and means for spraying said solution upon the solid material adjacent to the beater.

2. A compost mixer comprising a bed, a feed belt, a rotary bladed mixer, a trough below the mixer provided with a conveyer, a tank, and means for delivering fertilizer solution from the tank adjacent to the bladed mixer.

3. A compost mixer comprising a bed, a feed belt, a rotary bladed mixer, a transversely arranged trough below the mixer provided with a conveyer and a central discharge opening, a tank, a pump for forcing fluid from the tank into the trough, a longitudinally arranged trough adapted to receive material from the trough first mentioned, and a rotary conveyer in the last named trough.

4. In a compost mixer, the combination of running gear, a frame thereon, a box on the frame, a feed belt running on the bottom of the box, the box being provided with a discharge opening, separated hoppers below the discharge opening, rotary mixers in the hoppers, a trough transversely arranged below the hoppers, a helical conveyer in the trough having a helical blade progressing in opposite directions from the center, a tank, spray pipe and pump for forcing fluid from the tank into the trough, the trough being provided with a central discharge opening, and a longitudinal trough arranged with its forward end beneath said discharge opening, and a helical conveyer in the last named trough.

5. A compost mixer comprising a box-bed having a discharge aperture near one end, a feed belt continuously moving through the box for discharging solid material through said apertures, a rotary bladed mixer beneath said aperture for thoroughly fining and mixing material dropping through the aperture, a mixing trough below said rotary mixer, a tank for a solution, and means for discharging solution from the tank upon said solid material.

6. A compost mixer comprising a horizontally-arranged box having an aperture near one end of the bottom, a feed belt continuously moving over the bed of the box to carry solid fertilizer material to said aperture, a rotary bladed beater beneath said aperture, a mixing trough beneath said beater, a mixing device in said trough, a tank for solution, and means for spraying solution from said tank upon said solid material.

7. In a compost mixer, the combination of a box bed, a conveyer for moving solid material through said bed to a discharge point, a beater at the discharge point of said conveyer for thoroughly fining and mixing the solid material, and means for supplying a fertilizing solution to the solid material.

8. In a compost mixer, the combination of a substantially horizontal bed, a conveyer continuously moving over the bottom of the bed for carrying solid material to a discharge point of said conveyer, a beater adjacent to said discharge point for thoroughly fining and mixing solid material delivered by the conveyer, means for supplying a fertilizing solution to the solid material at a point adjacent to the beater, a mixing trough disposed below the beater to receive material discharged therefrom, and a conveyer in said trough.

9. A compost mixer comprising a box bed, a feed belt moving through the box for forwarding solid material disposed in the box, a beater disposed adjacent to the discharge point of the belt for thoroughly fining and mixing material delivered from the belt, a receptacle for fertilizer solution, and means for spraying said solution upon the solid material adjacent to the beater.

ARTHUR B. PICKETT.

Witnesses:
F. G. DOPPMAEDEL,
D. M. SMITH.